United States Patent
Song et al.

(10) Patent No.: US 11,025,631 B2
(45) Date of Patent: Jun. 1, 2021

(54) NETWORK ACCESS CONTROL

(71) Applicant: NEW H3C TECHNOLOGIES CO., LTD., Hangzhou (CN)

(72) Inventors: Yubing Song, Beijing (CN); Xiaopeng Yang, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 139 days.

(21) Appl. No.: 16/097,154

(22) PCT Filed: May 2, 2017

(86) PCT No.: PCT/CN2017/082690
§ 371 (c)(1),
(2) Date: Oct. 26, 2018

(87) PCT Pub. No.: WO2017/186181
PCT Pub. Date: Nov. 2, 2017

(65) Prior Publication Data
US 2019/0132322 A1 May 2, 2019

(30) Foreign Application Priority Data

Apr. 29, 2016 (CN) .......................... 201610288688.7

(51) Int. Cl.
*H04L 29/06* (2006.01)
*H04L 12/46* (2006.01)
(Continued)

(52) U.S. Cl.
CPC ........ *H04L 63/101* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS 8,675,664 B1  3/2014 Kamath et al.
2002/0101877 A1* 8/2002 Gan .................. H04L 47/10
370/437
(Continued)

FOREIGN PATENT DOCUMENTS

CN  1527209 A   9/2004
CN  1878112 A   12/2006
(Continued)

OTHER PUBLICATIONS

"Configuring IP Access Lists," Cisco Website, Available Online at https://www.cisco.com/c/en/us/support/docs/security/ios-firewall/23602-confaccesslists.html, Available as Early as Dec. 1, 2007, 16 pages.
(Continued)

*Primary Examiner* — Andrew C Oh
(74) *Attorney, Agent, or Firm* — McCoy Russell LLP

(57) ABSTRACT

This disclosure provides a method and device for controlling network access. According to the method, an aggregation switch may configure thereon an ACL rule comprising a first network segment and a second network segment, wherein the first network segment and the second network segment correspond to a same user group or different user groups, or the first network segment corresponds to a user group and the second network segment corresponds to a resource group. The aggregation switch may, after receiving a user packet from an access switch, match a source IP address of the user packet with the first network segment, and a destination IP address of the user packet with the second network segment. If the source IP address of the user packet matches with the first network segment and the destination IP address of the user packet matches with the second network segment, the user packet is discarded.

8 Claims, 6 Drawing Sheets

(51) Int. Cl.
*H04L 12/66* (2006.01)
*H04L 29/12* (2006.01)
*H04L 12/851* (2013.01)

(52) U.S. Cl.
CPC .............. *H04L 12/66* (2013.01); *H04L 29/06* (2013.01); *H04L 61/103* (2013.01); *H04L 63/0236* (2013.01); *H04L 63/0272* (2013.01); *H04L 12/46* (2013.01); *H04L 47/24* (2013.01)

(56) References Cited

U.S. PATENT DOCUMENTS

| | | | | |
|---|---|---|---|---|
| 2005/0025051 | A1* | 2/2005 | Roeder | H04L 61/10 370/230 |
| 2012/0014387 | A1* | 1/2012 | Dunbar | H04L 12/4641 370/395.53 |
| 2012/0130959 | A1* | 5/2012 | Wu | H04L 45/028 707/687 |
| 2012/0233657 | A1* | 9/2012 | Guevin | H04L 63/0272 726/1 |
| 2013/0250958 | A1* | 9/2013 | Watanabe | H04L 45/54 370/392 |
| 2013/0259043 | A1* | 10/2013 | Yamashita | H04L 49/10 370/390 |
| 2013/0305341 | A1* | 11/2013 | Baker | H04L 41/0886 726/11 |
| 2014/0019639 | A1* | 1/2014 | Ueno | H04L 61/103 709/238 |
| 2014/0092907 | A1* | 4/2014 | Sridhar | H04L 12/413 370/392 |
| 2014/0192810 | A1* | 7/2014 | Hikichi | H04L 45/126 370/392 |
| 2014/0233569 | A1 | 8/2014 | Yong et al. | |
| 2014/0269716 | A1* | 9/2014 | Pruss | H04L 45/306 370/392 |
| 2014/0348166 | A1* | 11/2014 | Yang | H04L 45/124 370/392 |
| 2015/0009992 | A1* | 1/2015 | Zhang | H04L 12/4633 370/392 |
| 2016/0094480 | A1* | 3/2016 | Kulkarni | H04L 47/805 370/230 |
| 2016/0099874 | A1* | 4/2016 | Hu | H04L 45/38 370/236 |
| 2016/0112270 | A1* | 4/2016 | Danait | H04L 41/142 709/220 |
| 2016/0352774 | A1* | 12/2016 | Akcin | H04L 63/10 |
| 2017/0019373 | A1* | 1/2017 | Meng | H04L 45/021 |
| 2017/0171056 | A1* | 6/2017 | Dong | H04L 45/66 |
| 2017/0207992 | A1* | 7/2017 | Huang | H04L 43/50 |
| 2017/0237655 | A1* | 8/2017 | Yang | H04L 61/103 370/254 |
| 2017/0244645 | A1* | 8/2017 | Edsall | H04L 63/08 |
| 2017/0257260 | A1* | 9/2017 | Govindan | H04L 41/0654 |
| 2017/0257309 | A1* | 9/2017 | Appanna | H04L 12/4633 |
| 2017/0272442 | A1* | 9/2017 | Klimovs | H04L 63/101 |
| 2017/0310586 | A1* | 10/2017 | Lin | H04L 12/6418 |
| 2017/0317850 | A1* | 11/2017 | Huang | H04L 12/4633 |
| 2018/0309781 | A1* | 10/2018 | Tandel | H04L 63/0272 |

FOREIGN PATENT DOCUMENTS

| | | |
|---|---|---|
| CN | 101022394 A | 8/2007 |
| CN | 102255918 A | 11/2011 |
| CN | 102404346 A | 4/2012 |
| JP | 2012190409 A | 10/2012 |
| JP | 2013097394 A | 5/2013 |
| WO | 2013169535 A1 | 11/2013 |

OTHER PUBLICATIONS

Lasserre, M. et al., "Framework for DC Network Virtualization," Internet Engineering Task Force Website, Available online at https://toolsietf.org/html/draft-ietf-nvo3-framework-05, Jan. 20, 2014, 26 pages.

Black, D. et al., "An Architecture for Overlay Networks (NVO3)," Internet Engineering Task Force Website, Available Online at https://toolsietf.org/html/draft-ietf-nvo3-arch-01, Feb. 14, 2014, 34 pages.

ISA State Intellectual Property Office of the People's Republic of China, Written Opinion of the International Searching Authority Issued in Application No. PCT/CN2017/082690, dated Jun. 23, 2017, WIPO, 4 pages.

European Patent Office, Extended European Search Report Issued in Application No. 17788833.6, dated Feb. 18, 2019, Germany, 12 pages.

State Intellectual Property Office of the People's Republic of China, Office Action and Search Report Issued in Application No. 201610288688.7, dated Jun. 5, 2019, 12 pages. (Submitted with Partial Translation).

Japanese Patent Office, Office Action Issued in Application No. 2018-556323, dated Sep. 24, 2019, 4 pages. (Submitted with Machine Translation).

ISA State Intellectual Property Office of the People's Republic of China, International Search Report Issued in Application No. PCT/CN2017/082690, dated Jun. 23, 2017, WIPO, 4 pages.

State Intellectual Property Office of the People's Republic of China, Office Action and Search Report Issued in Application No. 201610288688.7, dated Jan. 15, 2020, 12 pages. (Submitted with Machine Translation).

* cited by examiner

NETWORK ACCESS CONTROL

CROSS REFERENCE TO RELATED APPLICATIONS

This present application is a U.S. National Phase of International Patent Application Serial No. PCT/CN2017/082690 entitled "NETWORK ACCESS CONTROL," filed on May 02, 2017. International Patent Application Serial No. PCT/CN2017/082690 claims priority to Chinese Patent Application No. 201610288688.7 filed on Apr. 29, 2016. The entire contents of each of the above-cited applications are hereby incorporated by reference in their entirety for all purposes.

BACKGROUND

In an enterprise network, users may be classified out of consideration for information security. All users may be divided into a plurality of user groups. Users in the same user group may have the same network access authority, and users in different user groups may have different network access authorities.

Virtual Local Area Network (VLAN) and Access Control List (ACL) rules may be configured on an access switch in advance. Different ACL rules are used for defining network access authorities corresponding to different VLANs.

DETAILED DESCRIPTION OF THE EMBODIMENTS

Exemplary examples will be described in detail herein in conjunction with the figures. When the following descriptions involve the figures, like numerals in different figures represent like or similar elements unless otherwise stated. Examples described in the following exemplary examples are not all examples consistent with the present disclosure. On contrary, they are merely examples of a device and method consistent with some aspects of the present disclosure that are described in detail in the appended claims.

The following examples of the present disclosure provide a method for controlling network access and a device to which the method may be applied.

The examples of the present disclosure may be applied in an enterprise network. For example, the enterprise network may include several types of devices such as access switch, aggregation switch and core switch, wherein the core switch may be connected to the aggregation switch; the aggregation switch may be connected to the access switch, and the access switch may be used for enabling user access. The overlay technology may be applied to the aggregation switch and the core switch.

Figure 1:
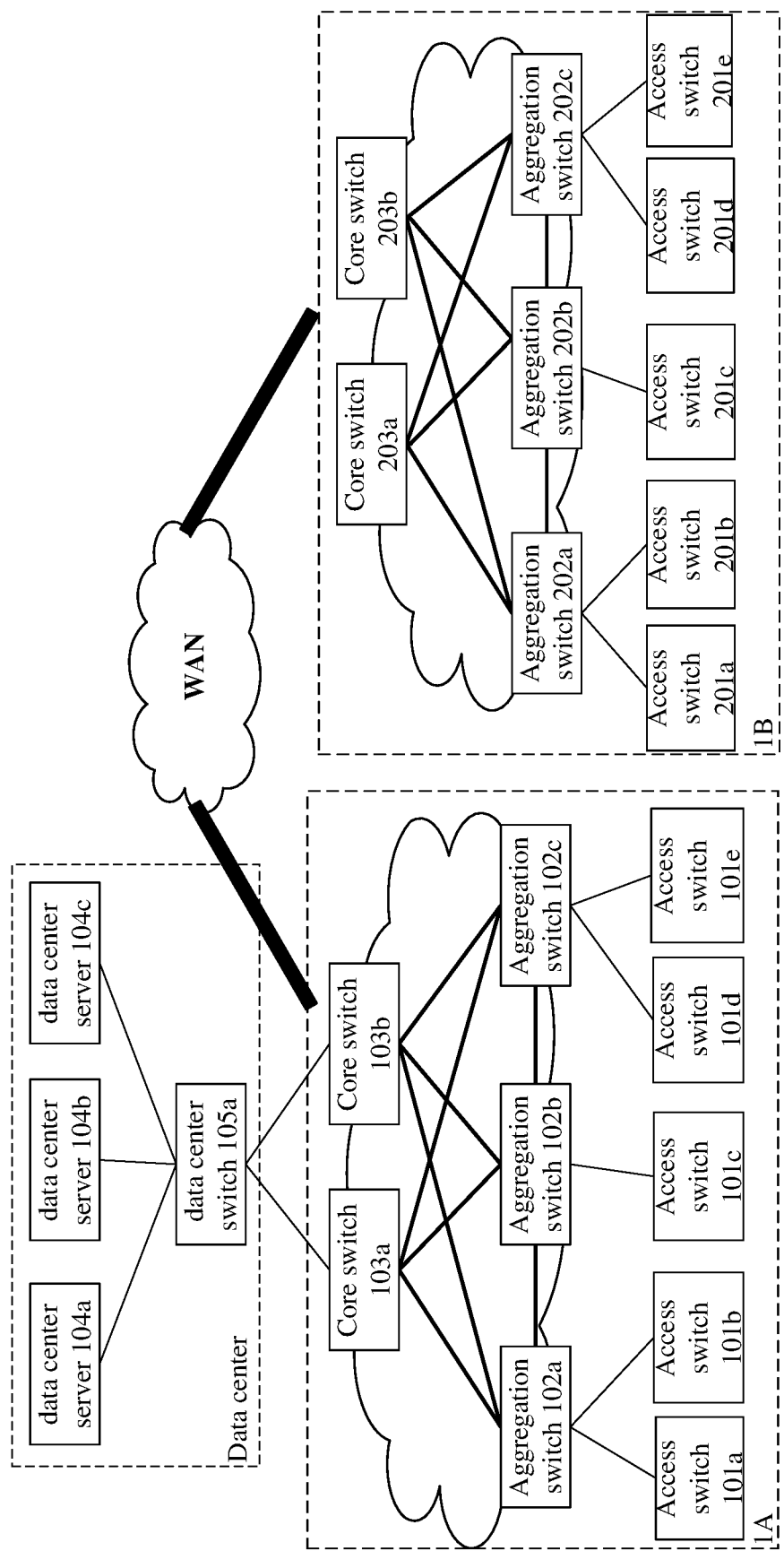
FIG. 1 schematically illustrates a network architecture diagram of an enterprise network shown in an exemplary example of the present disclosure.

In addition, an enterprise network may include a plurality of sub-networks. For example, as shown in FIG. 1, the enterprise network may include a sub-network 1A and a sub-network 1B. The sub-network 1A includes: access switches 101a to 101e, aggregation switches 102a to 102c, and core switches 103a and 103b. The sub-network 1B includes: access switches 201a to 201e, aggregation switches 202a to 202c, and core switches 203a and 203b. The overlay technology may be applied to these aggregation switches or core switches. These aggregation switches or core switches may belong to the same sub-network or to different sub-networks. In an example of the present disclosure, an access switch merely refers to a network device having an information switching function in general, which may be Ethernet switch, radio Access Controller (AC), etc. The enterprise network may access a data center. As shown in FIG. 1, a data center may include data center servers 104a to 104c and a data center switch 105a.

The overlay technology means overlaying a virtual network on an existing physical network, wherein the virtual network may be a virtual layer-2 network, thus leading to many advantages such as simplified configurations, user migrating and the like. Typical overlay technology mainly includes Virtual eXtensible LAN (VXLAN), Network Virtual Generic Routing Encapsulation (NVGRE), Stateless Transfer Tunnel (STT), etc.

By using the overlay technology, the whole network may be constructed into a virtual layer-2 network, which, as shown in FIG. 1, may cover not only an enterprise network including multiple sub-networks, but also a Wide Area Network (WAN). Thus, the sub-networks 1A and 1B may be interconnected across the WAN to form a large end-to-end layer-2 network.

Taking VXLAN technology for example, in the enterprise network shown in FIG. 1, a VXLAN tunnel may be established between aggregation switches in the same sub-network, between aggregation switches in different sub-networks, between an aggregation switch and a core switch in the same sub-network, and between an aggregation switch and a core switch in different sub-networks.

On a control plane, an Ethernet VPN (EVPN) mechanism may be used to synchronize routing and Media Access Control (MAC) address information and suppress broadcasting of packets.

A method of controlling network access provided by an example of the present disclosure may include contents as follows.

A Software-Defined Network (SDN) controller may receive and save configuration information, wherein the configuration information includes user group information, resource group information, and various access control policies. The configuration information may be configured on the SDN controller in a static configuration way.

The user group information may be shown as in Table 1, and the resource group information may be shown as in Table 2.

TABLE 1

| User Group Identifier | VLAN Identifier | VXLAN Identifier | Network Segment |
|---|---|---|---|
| User Group 1 | 10 | 10 | 10.10.1.1/24 |
| User Group 2 | 20 | 20 | 10.20.1.1/24 |
| User Group 3 | 30 | 30 | 10.30.1.1/24 |

As shown in Table 1, the user group information may include user group identifier, and Virtual Local Area Network (VLAN) identifier, VXLAN identifier and Network Segment, and it is apparent that one user group may correspond to one VLAN, one VXLAN and one network segment.

All users may be grouped by user's identity. Apparently, users may also be grouped by other ways, such as user's age, user's locale, and the like, which is not limited in an example of the present disclosure. Users in the same user group may have the same network access authority, and users in different user groups may have different network access authorities.

TABLE 2

| Resource Group Identifier | IP Address of Data Center Server |
|---|---|
| Resource Group 1 | 10.100.0.0/24 |
| Resource Group 2 | 10.200.0.0/24 |

As shown in Table 2, the resource group information may include resource group identifier and Internet Protocol (IP) address of data center server included in the resource group, wherein one resource group identifier may correspond to IP address of at least one data center server. When one resource group identifier corresponds to a plurality of IP addresses, these IP addresses may be all IP addresses in a network segment. For example, assuming that there are three servers a, b, c in a data center, resource group 1 may include server a, and resource group 2 may include servers b and c, wherein the IP addresses of servers b and c belong to the same network segment.

Various access control policies may be visually represented as per Table 3.

TABLE 3

|  | User group 1 | User group 2 | User group 3 | Resource Group 1 | Resource Group 2 |
|---|---|---|---|---|---|
| User Group 1 |  |  |  |  | deny |
| User Group 2 |  | deny | deny |  |  |
| User Group 3 | deny |  |  | deny |  |

As shown in Table 3, various access control policies may include: an access control policy in the same user group, and/or an access control policy between different user groups, and/or an access control policy between a user group and a resource group. In table 3, if a mark "deny" is put in a position in the $m^{th}$ row and the $n^{th}$ column, it indicates that mutual access between users in a user group in the $m^{th}$ row and users in a user group in the $n^{th}$ column is prohibited, or indicates that access of a user group in the $m^{th}$ row to a data center server in a resource group in the $n^{th}$ column is prohibited. Wherein when a user group in the $m^{th}$ row and a user group in the $n^{th}$ column are the same user group, access control within the same user group is achieved. When a user group in the $m^{th}$ row and a user group in the $n^{th}$ column are not the same user group, access control between different user groups is achieved.

Apparently, if the mark "deny" is absent in a position in the $m^{th}$ row and the $n^{th}$ column, it indicates that access is allowed.

For example, in table 3, the mark "deny" present in the position in the $4^{th}$ row and the $2^{nd}$ column indicates that mutual access between users in user group 1 and users in user group 3 is prohibited; the mark "deny" present in the position in the $3^{rd}$ row and the $3^{rd}$ column indicates that mutual access between users in user group 2 is prohibited; the mark "deny" present in the position in the $2^{nd}$ row and the $6^{th}$ column indicates access of users in user group 1 to a data center server in resource group 2 is prohibited, and it thus can be seen in conjunction with Table 2 that access to a data center server with the IP address belonging to the network segment 10.200.0.0/24 is prohibited.

A SDN controller may send contents in the user group information, the resource group information, and the various access control policies to various devices in a network, for example, access switch, aggregation switch, core switch, and Dynamic Host Configuration Protocol (DHCP) server, etc., such that they may proceed with configurations. The configuration process may be as shown below.

The SDN controller may send VLAN identifiers corresponding to all user groups to all access switches. Each access switch may, after receiving a VLAN identifier, configure thereon the VLAN and configure an upstream port thereof in connection with an aggregation switch as being allowed to send a packet carrying the VLAN identifier. Thus, the access switch may send a packet encapsulated with the VLAN identifier via the upstream port.

The SDN controller may send VLAN identifier corresponding to a user group to all aggregation switches. Each aggregation switch may, after receiving the VLAN identifier, configure thereon the VLAN and configure a downstream port thereof in connection with an access switch as being allowed to receive a packet carrying the VLAN identifier. Thus, the aggregation switch may receive a packet encapsulated with the VLAN identifier via the downstream port. The aggregation switch may configure VXLANs corresponding to all user groups and establish a corresponding relationship among VLAN, VXLAN and network segment. The aggregation switch may configure IP address and MAC address of gateway of VXLAN, wherein VXLAN virtual interface corresponding to VXLAN may be configured as gateway for corresponding network segment. Thus, each aggregation switch is configured with the gateways for all network segments. In this way, no matter where a user moves and which aggregation switch an access switch accesses, the aggregation switch is configured with a gateway for a network segment to which an IP address corresponding to the user belongs.

The SDN controller may send VXLAN identifiers corresponding to all user groups to all core switches. Each core switch may, after receiving VXLAN identifier, configure thereon the VXLAN and a layer-3 gateway address thereof. In addition, a core switch may also configure routing connection with external devices, such as a data center switch and the like, by a routing protocol.

The SDN controller may also send the various access control policies as shown in Table 3 to all aggregation switches. Each aggregation switch may, after receiving these contents, configure thereon corresponding ACL rule. An ACL rule includes: a first network segment and a second network segment, wherein the first network segment and the second network segment correspond to the same user group, or to different user groups; alternatively, the first network segment corresponds to a user group and the second network segment corresponds to a resource group.

It thus can be seen that when the first network segment and the second network segment correspond to the same user group, the ACL rule may be used to prohibit mutual access between users in the same user group; when the first network segment and the second network segment correspond to different user groups, the ACL rule may be used to prohibit mutual access between users in different user groups; and when the first network segment corresponds to a user group and the second network segment corresponds to a resource group, the ACL rule may be used to prohibit access of users in the user group to a data center server in the resource group.

For example, the ACL rules configured as per the access control policies as shown in Table 3 are shown below:

| | |
|---|---|
| ACL1 | deny source 10.10.1.1/24 destination 10.200.0.0/24 |
| ACL2 | deny source 10.20.1.1/24 destination 10.20.1.1/24 |
| ACL3 | deny source 10.20.1.1/24 destination 10.30.1.1/24 |
| ACL4 | deny source 10.30.1.1/24 destination 10.20.1.1/24 |
| ACL5 | deny source 10.30.1.1/24 destination 10.10.1.1/24 |
| ACL6 | deny source 10.10.1.1/24 destination 10.30.1.1/24 |
| ACL7 | deny source 10.30.1.1/24 destination 10.100.0.0/24 |

ACL1 may be used to prohibit access of users in user group 1 to a data center server in resource group 2; ACL2 may be used to prohibit mutual access between users in user group 2; ACL5 and ACL4 may be used to prohibit mutual access between users in user group 2 and user group 3; ACL5 and ACL6 may be used to prohibit mutual access between users in user group 1 and user group 3; and ACL7 may be used to prohibit access of users in user group 3 to a data center server in resource group 1.

The SDN controller may configure a corresponding relationship between user group and VLAN. In addition, an authentication server may also be configured with a corresponding relationship between user and user group; thus, a corresponding relationship among user, user group and VLAN may be saved on the authentication server.

The SDN controller may send all network segments to a DHCP server, and configure a corresponding relationship between VLAN and address pool. IP address of each network segment may be saved in one address pool and a corresponding relationship between VLAN and address pool may be established.

In order to achieve access control within the same user group, a port isolating function may be enabled on an access switch, and isolation between different virtual tunnels (a VLAN to which a physical port of an access switch belongs is transformed into a virtual tunnel on an aggregation switch) is enabled on an aggregation switch. Thus, a packet received by the access switch via a user port can only be forwarded to an aggregation switch via an upstream port in connection with the aggregation switch for performing network access control. In addition, as the port isolating function is enabled on the access switch, an Address Resolution Protocol (ARP) request packet sent by a user can only be forwarded to an aggregation switch, and therefore, each gateway on the aggregation switch may be configured with an ARP proxy function. Thus, the aggregation switch may, after receiving the ARP request packet, respond to the ARP request packet.

After the above-described configuration process is completed, a user may carry on access authentication and access the network upon successful authentication.

In the access authentication process of any user, the authentication server may determine a user group to which the user belongs, and may further determine a VLAN corresponding to the user group and send an identifier of the VLAN (i.e., the VLAN identifier) to an access switch; then, the access switch may, after receiving the VLAN identifier, add a user port thereof for access of the user to the VLAN. Subsequently, the user may make a request for an IP address. An aggregation switch may determine a VLAN to which the user port having received the address request packet belongs after receiving the address request packet from the user. Next, the aggregation switch may encapsulate the VLAN identifier in the address request packet and then send the address request packet to a DHCP server. When receiving the address request packet, the DHCP server may find a network segment corresponding to the VLAN identifier encapsulated in the address request packet, select one unoccupied IP address from the network segment and send a response packet which carries the selected IP address to the aggregation switch, and the response packet may be forwarded to the user via the aggregation switch so that the user can obtain an IP address in the network segment corresponding to the user group to which the user belongs.

For any user, as long as a user group to which the user belongs remains unchanged, the user can obtain an IP address in a network segment corresponding to the user group no matter where the user accesses; that is, the user's IP address is always an IP address in the same network segment. Therefore, a packet sent by the user can always hit an ACL rule including the network segment.

After obtaining the IP address and before sending a user packet to a data center server or another user with the IP address of IP1 (IP1 is a target IP address), the user may first obtain an MAC address corresponding to IP1. At this time, a determination may be made on whether IP1 and the user's IP address belong to the same network segment. If yes, an ARP request packet with a source IP address as the IP address of the user and a destination IP address as IP1 may be sent; and if no, an ARP request packet with the source IP address as the IP address of the user and the destination IP address as gateway IP address of a network segment to which the user's IP address belongs may be sent.

The access switch may determine, after receiving the ARP request packet, a VLAN to which a user port having received the ARP request packet belongs, and may encapsulate an identifier of the VLAN in the ARP request packet. As the port isolating function is enabled, the access switch may send the ARP request packet to an aggregation switch.

Figure 2:
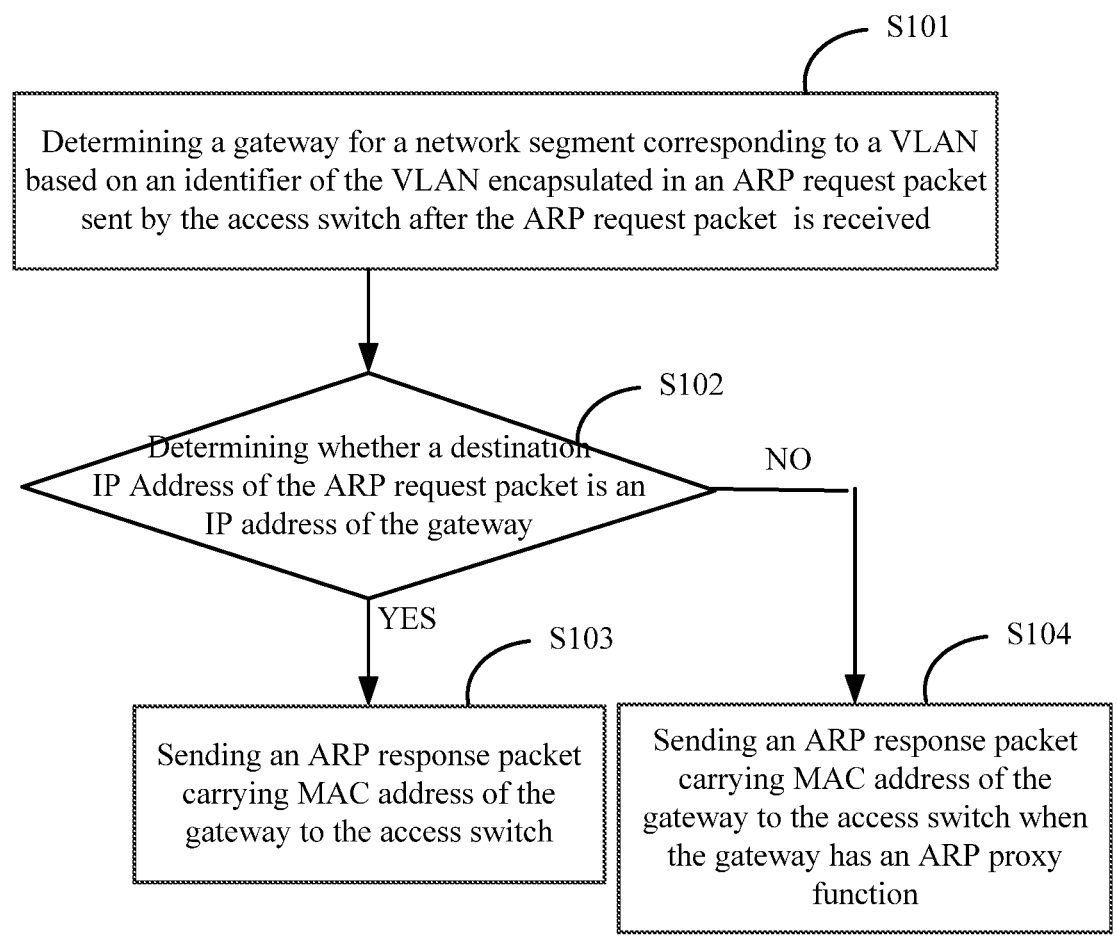
FIG. 2 illustrates a flow diagram of processing an ARP request packet by an aggregation switch shown in an exemplary example of the present disclosure.

As shown in FIG. 2, the aggregation switch, after receiving the ARP request packet, may execute the following blocks.

At block S101, when receiving the ARP request packet sent by the access switch, the aggregation switch may determine a gateway for a network segment corresponding to a VLAN based on an identifier of the VLAN encapsulated in the ARP request packet.

At block S102, the aggregation switch may determine whether a destination IP address of the ARP request packet is an IP address of the gateway determined in block S101, and if yes, block S103 is executed; otherwise, block S104 is executed.

At block S103, the aggregation switch may send an ARP response packet carrying MAC address of the gateway to the access switch so as to forward the ARP response packet to the user via the access switch.

At block S104, when the gateway is configured with an ARP proxy function, the aggregation switch may send the ARP response packet carrying the MAC address of the gateway to the access switch so as to forward the ARP response packet carrying the MAC address to the user via the access switch. When the gateway is not configured with the ARP proxy function, it is apparent that no response will be made.

After the user terminal receives the ARP response packet, a corresponding relationship between IP1 and the MAC address of the gateway may be established. Subsequently, the user terminal may send a user packet with destination IP address as IP1 and destination MAC address as the MAC address of the gateway.

A specific flow of carrying out network access control on the user packet is shown below.

An access switch, after receiving the user packet, may determine a VLAN to which a user port having received the user packet belongs, encapsulate an identifier of the VLAN in the user packet and then forward the encapsulated packet to an aggregation switch.

Figure 3:
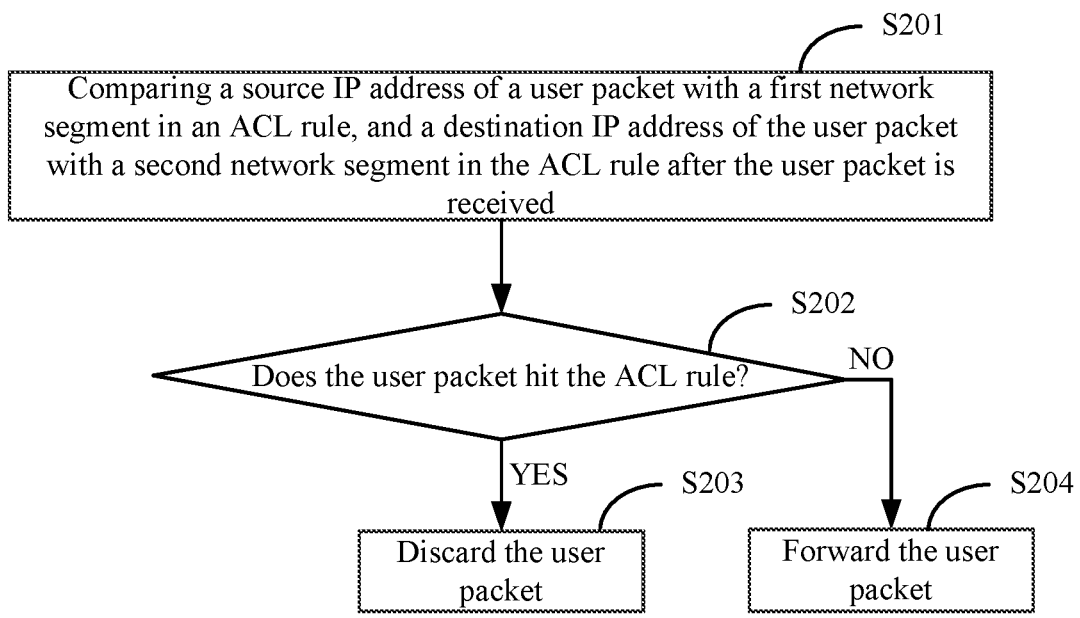
FIG. 3 illustrates a flow diagram of network access control processing on a user packet by an aggregation switch shown in an exemplary example of the present disclosure.

As shown in FIG. 3, the aggregation switch may, after receiving the user packet, execute the following blocks.

At block S201, when receiving the user packet, the aggregation switch may compare a source IP address of the user packet with a first network segment in an ACL rule, and compare a destination IP address of the user packet with a second network segment in the ACL rule.

At block S201, if the source IP address of the user packet matches with the first network segment, and the destination IP address of the user packet matches with the second network segment, it indicates that the user packet hits the ALC rule. Otherwise, if the source IP address of the user packet does not match with the first network segment, and/or the destination IP address of the user packet does not match with the second network segment, it indicates that the user packet does not hit the ACL rule.

At block S202, the aggregation switch may determine whether the user packet hits the ACL rule. If yes, block S203 is executed; otherwise, block S204 is executed.

At block S203, the aggregation switch may discard the user packet.

At block S204, the aggregation switch may forward the user packet.

For example, in block S204, the aggregation switch may search a routing table for a corresponding egress interface based on the destination IP address of the user packet. If the found egress interface is a downstream port of the aggregation switch, the user packet may be forwarded via the found downstream port. If the found egress interface is a VXLAN tunnel interface, the aggregation switch may find out a VXLAN identifier corresponding to a VLAN identifier encapsulated in the user packet, and VXLAN-encapsulate the user packet and forward the encapsulated user packet.

The VLAN mentioned in the above examples of the present disclosure refers to a VLAN corresponding to a user group.

The method shown in the above examples of the present disclosure achieve the following technical effects.

The overlay technology is applied to aggregation switch and core switch such that an overlay network architecture, i.e., a large virtual layer-2 network having the advantage of user migratability, is constructed.

An aggregation switch is configured with ACL rule. The ACL rule includes: a first network segment and a second network segment, wherein the first network segment and the second network segment may correspond to the same user group or different user groups. In another example, the first network segment may correspond to a user group and the second network segment may correspond to a resource group. No matter where a user accesses, a VLAN corresponding to a user group to which the user belongs may be assigned to the user and an IP address in a network segment corresponding to the VLAN may be assigned to the user during access authentication. An aggregation switch may, after receiving a user packet from the user, matches the user packet with an ACL rule. If the user packet hits the ACL rule, it may be discarded. Thus, network access to a data center server in the resource group may be controlled, and network access within the same user group or between different user groups may also be controlled.

As ACL rule is configured on aggregation switch instead of access switch and the number of the aggregation switches is obviously smaller than that of the access switches, the total number of the ACL rules to be configured may be reduced, thereby decreasing the configuration workload.

As long as a user group to which the user belongs remains unchanged, the VLAN assigned to the user is unchanged, and so is a network segment to which the IP address assigned to the user belongs. Therefore, a user packet sent by the user can always hit an ACL rule including the network segment no matter where the user moves, and the ACL rule may not be impacted by change of the user's access position, thereby avoiding updating of the ACL rule caused by the change of the user's access position. Also, when there is a need to achieve network access control within the same user group, only one ACL rule is required, and at this time, the first network segment and the second network segment in the ACL rule both correspond to the user group; thus, the number of the ACL rules to be configured is greatly reduced and the ACL resources are saved.

As an overlay network architecture is constructed, the method may be applied to a super-large-scale network and an across-WAN network.

Corresponding to the example of the above-described method of controlling network access, an example of a device for controlling network access is also provided in the present disclosure.

Figure 4:
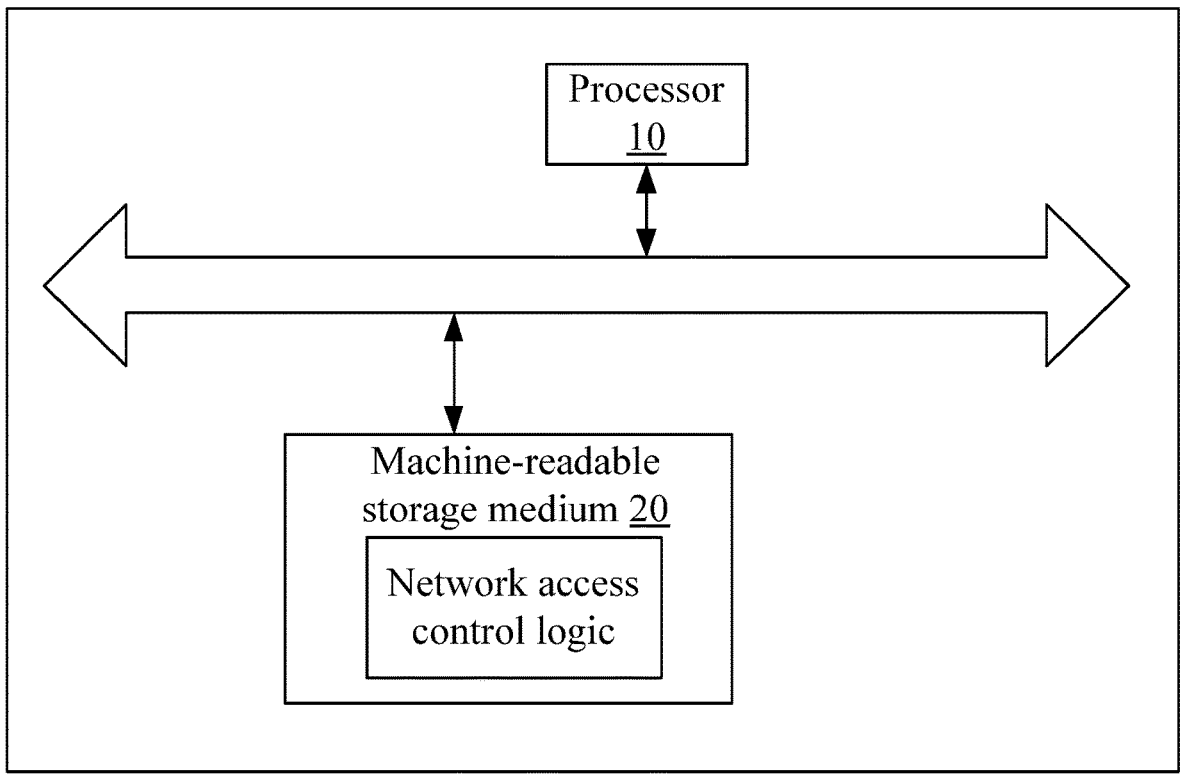
FIG. 4 schematically illustrates a hardware architecture diagram of a device for controlling network access shown in an exemplary example of the present disclosure.

An example of a device for controlling network access of the present disclosure may be applied to an aggregation switch. The device example may be implemented by software or by hardware or a combination thereof. From hardware level, as shown in FIG. 4, illustrated is a hardware structure diagram of a device for controlling network access of the present disclosure. The device for controlling network access includes a processor 10 and a machine-readable storage medium 20.

Machine-readable instructions corresponding to a network access control logic are stored in the machine-readable storage medium 20.

The processor 10 communicates with the machine-readable storage medium 20 to read and execute the machine-readable instructions stored in the machine-readable storage medium 20, thereby implementing the method of controlling network access as described in FIG. 3.

As used herein, a "machine-readable storage medium" may be any electronic, magnetic, optical or other physical storage device to contain or store information such as executable instructions, data, and the like. For example, any machine-readable storage medium described herein may be any of a Random Access Memory (RAM), a volatile memory, a nonvolatile memory, a flash memory, a storage drive (e.g., hard drive), a solid state disk, any type of storage disc (e.g., compact disc, DVD, etc.), and the like, or a combination thereof.

Figure 5:
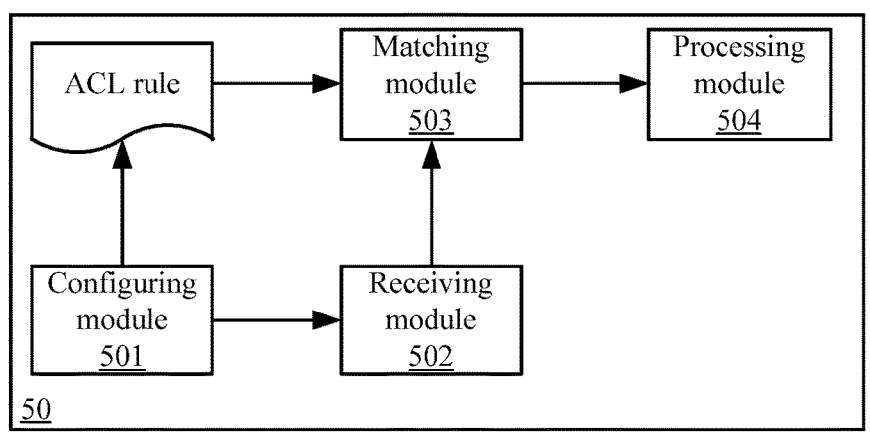
FIG. 5 schematically illustrates a structural diagram of a device for controlling network access shown in an exemplary example of the present disclosure.

An example of the present disclosure also provides a device for controlling network access that may be applied to an aggregation switch. Referring to FIG. 5, the device 50 for controlling network access includes the following modules:

a configuring module 501 to configure an ACL rule on an aggregation switch, wherein the ACL rule includes: a first network segment and a second network segment, wherein the first network segment and the second network segment correspond to a same user group or different user groups; or the first network segment corresponds to a user group and the second network segment corresponds to a resource group;

a receiving module 502 to receive a user packet from a user terminal sent by an access switch;

a matching module 503 to compare a source IP address of the user packet with the first network segment in the ACL rule and compare a destination IP address of the user packet with the second network segment in the ACL rule after the receiving module 502 receives the user packet sent by the access switch, wherein the source IP address of the user packet is an IP address in a network segment corresponding to a Virtual Local Area Network (VLAN) associated with a user group to which the user terminal belongs; and a processing module 504 to discard the user packet when the matching module 503 determines that the source IP address of the user packet matches with the first network segment and the destination IP address of the user packet matches with the second network segment.

The receiving module 502 is also to receive a VLAN identifier corresponding to a user group sent by an SDN controller.

After the receiving module 502 receives the VLAN identifier, the configuring module 501 is also to configure a VLAN and a VXLAN corresponding to the user group on the aggregation switch based on the VLAN identifier, and also to configure a gateway IP address and an MAC address of the VXLAN.

Figure 6:
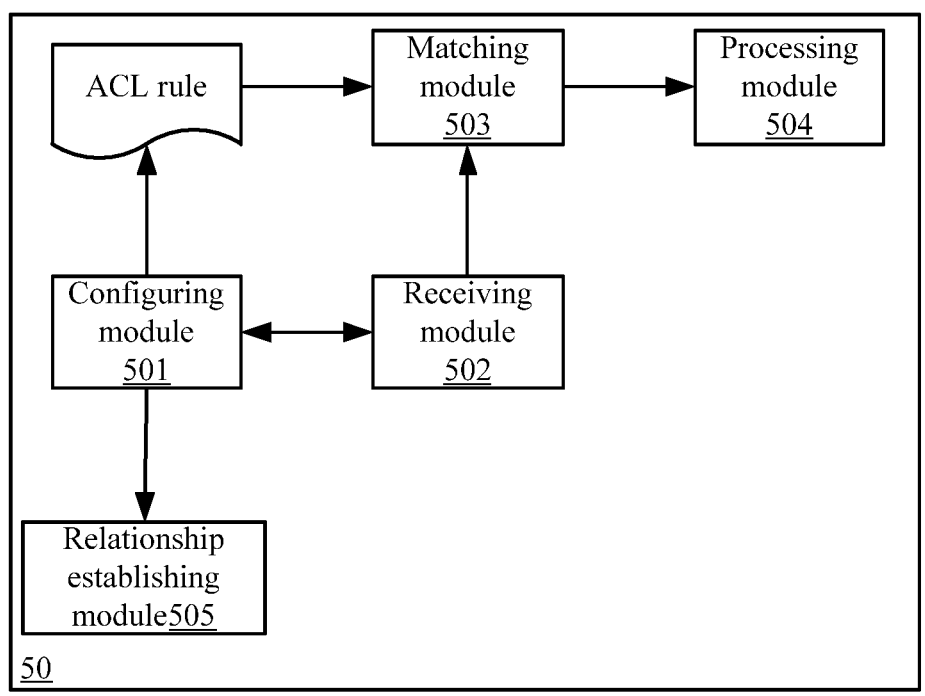
FIG. 6 schematically illustrates another structural diagram of a device for controlling network access shown in an exemplary example of the present disclosure.

As shown in FIG. 6, the device 50 for controlling network access also includes: a relationship establishing module 505 to establish a corresponding relationship among VLAN, VXLAN and network segment.

For example, if the matching module 503 determines that the source IP address of the user packet does not match with the first network segment, or the destination IP address of the user packet does not match with the second network segment, the processing module 504 is also to search a routing table for a corresponding egress interface based on the destination IP address, and if the found egress interface is a downstream port of the device, forward the user packet via the found downstream port, and if the found egress interface is a VXLAN tunnel interface, search for a VXLAN identifier corresponding to the VLAN identifier encapsulated in the user packet and forward a VXLAN-encapsulated packet carried with the VXLAN identifier after performing VXLAN encapsulation for the user packet.

Figure 7:
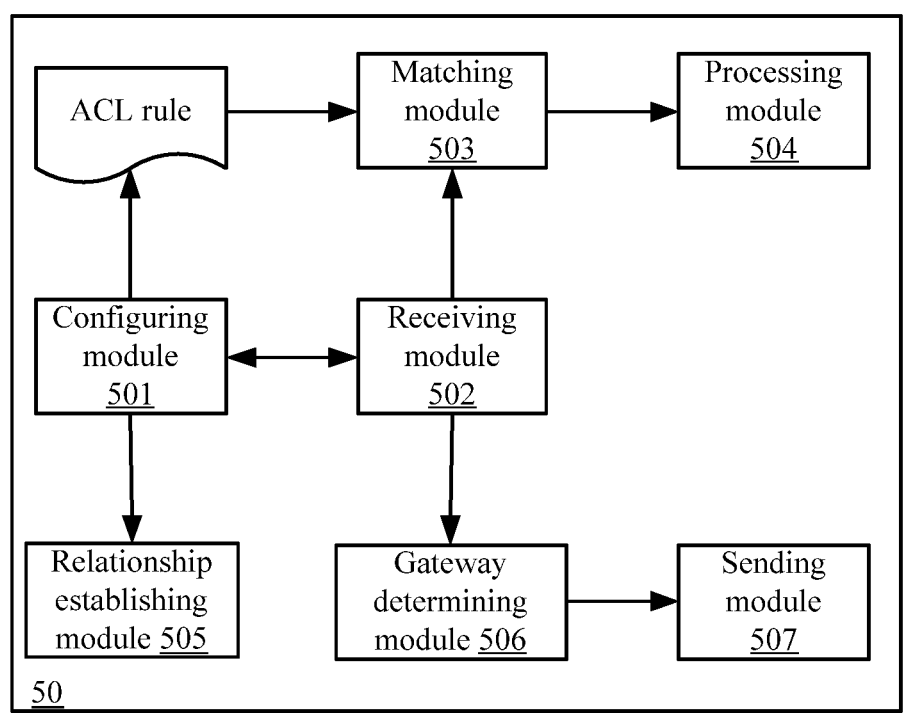
FIG. 7 schematically illustrates yet another structural diagram of a device for controlling network access shown in an exemplary example of the present disclosure.

In addition, as shown in FIG. 7, the above device 50 for controlling network access control also includes: a gateway determining module 506 and a sending module 507.

The receiving module 502 is also to receive an ARP request packet for a target IP address from an access switch.

After the receiving module 502 receives the ARP request packet, the gateway determining module 506 is to determine a gateway for a network segment corresponding to a VLAN based on a VLAN identifier of the VLAN, which is encapsulated in the ARP request packet.

If a destination IP address of the ARP request packet is the IP address of the determined gateway, the sending module 507 is to send an ARP response packet carrying MAC address of the determined gateway to an access switch, and if the destination IP address of the ARP request packet is not the IP address of the determined gateway, send an ARP response packet carrying the MAC address of the gateway to an access switch when the determined gateway has an ARP proxy function, such that the user terminal, after receiving the ARP response packet forwarded by the access switch, establishes a corresponding relationship between the target IP address and the MAC address of the gateway and sends a user packet with the destination IP address as target IP address and the destination MAC address as MAC address of the determined gateway to the access switch.

In an example, when the target IP address and the source IP address of the ARP request packet belong to the same network segment, the gateway determining module 506 determines the destination IP address of the ARP request packet as the target IP address; and when the target IP address and the source IP address of the ARP request packet belong to different network segments, the gateway determining module 606 determines the destination IP address of the ARP request packet as the IP address of the determined gateway.

The implementation process of functions and roles of various units in the above-described device is the same as the implementation process of corresponding blocks in the above-described method, which is not described redundantly herein.

As the device examples basically correspond to the method examples, for correlations therebetween, reference may be made to part of descriptions of the method examples. The device examples described above are merely illustrative, wherein the units explained as separate members may be or may not be physically separate, and members displayed as units may be or may not be physical units, i.e., may be located in one place, or may be distributed to a plurality of a plurality of network units. Part of or all modules therein may be selected according to actual requirements to implement the objectives of the solutions of the present disclosure. Those of ordinary skill in the art may understand and carry out them without creative work.

The terminology used in the present disclosure is merely for the purpose of describing specific examples, and not intended to limit the present disclosure. The singular form "a", "said" and "the" used in the present disclosure and the appended claims are also intended to include the plural form unless clearly otherwise stated in context. It should also be understood that the term "and/or" used herein means including any or all possible combinations of one or more associated listed items.

It should be understood that while terms "first", "second", "third" and the like may be used to describe various information in the present disclosure, the information should not be limited to these terms. These terms are merely used to distinguish the pieces of information of the same type. For example, without departing from the scope of the present disclosure, first information may also be referred to as second information, and similarly, second information may also be referred to as first information. Depending on the context, for example, the term "if" used herein may be interpreted as "in", "when" or "in response to determination".

The foregoing descriptions are merely examples of the present disclosure, and not intended to limit the present disclosure. Any modifications, equivalent substitutions, improvements and the like made within the spirit and principles of the present disclosure are encompassed in the protection scope of the present disclosure.

The invention claimed is:

1. A method for controlling network access, comprising:
configuring, by an aggregation switch, an Access Control List (ACL) rule on the aggregation switch, wherein the ACL rule comprises a first network segment and a second network segment, and the first network segment and the second network segment correspond to a same user group or different user groups, or the first network segment corresponds to a user group and the second network segment corresponds to a resource group;
receiving, by the aggregation switch, a user packet from a user terminal sent by an access switch;
comparing, by the aggregation switch, a source Internet Protocol (IP) address of the user packet with the first network segment in the ACL rule and a destination IP address of the user packet with the second network segment in the ACL rule, wherein the source IP address of the user packet is an IP address in a network segment corresponding to a Virtual Local Area Network (VLAN) associated with a user group to which the user terminal belongs; and
discarding, by the aggregation switch, the user packet when the source IP address of the user packet matches with the first network segment and the destination IP address of the user packet matches with the second network segment,
receiving, by the aggregation switch, a VLAN identifier corresponding to a user group from a Software-Defined Network (SDN) controller;
configuring, by the aggregation switch, VLAN and VXLAN corresponding to the user group on the aggregation switch;
establishing a corresponding relationship among the VLAN, the VXLAN and a network segment; and configuring, by the aggregation switch, a gateway IP address and Media Access Control (MAC) address of the VXLAN;
searching, by the aggregation switch, a routing table for a corresponding egress interface based on the destination IP address when the source IP address of the user packet does not match with the first network segment, or the destination IP address of the user packet does not match with the second network segment;
forwarding, by the aggregation switch, the user packet via a downstream port of the aggregation switch when the found egress interface is the downstream port;
searching, by the aggregation switch, for a VXLAN identifier corresponding to a VLAN identifier encapsulated in the user packet when the found egress interface is a VXLAN tunnel interface; and obtaining, by the aggregation switch, a VXLAN-encapsulated packet carried with the VXLAN identifier by performing VXLAN encapsulation for the user packet; and
forwarding the VXLAN-encapsulated packet.

2. The method according to claim 1, further comprising:
receiving, by the aggregation switch, an Address Resolution Protocol (ARP) request packet for a target IP address sent by the access switch before receiving the user packet sent by the access switch;
determining, by the aggregation switch, a gateway for a network segment corresponding to a VLAN based on a VLAN identifier of the VLAN, which is encapsulated in the ARP request packet; and determining, by the aggregation switch, a destination IP address of the ARP request packet based on the target IP address and the source IP address of the ARP request packet.

3. The method according to claim 2, further comprising:
in case that the destination IP address of the ARP request packet is an IP address of the determined gateway, sending, by the aggregation switch, an ARP response packet carrying an MAC address of the determined gateway to the access switch; and in case that the destination IP address of the ARP request packet is not the IP address of the determined gateway, sending, by the aggregation switch, an ARP response packet carrying the MAC address of the determined gateway to the access switch when the determined gateway has an ARP proxy function, such that the user terminal, after receiving the ARP response packet sent by the access switch, establishes a corresponding relationship between the target IP address and the MAC address of the gateway and sends a user packet with a destination IP address as the target IP address and a destination MAC address as the MAC address of the determined gateway to the access switch.

4. The method according to claim 2, wherein determining the destination IP address of the ARP request packet based on the target IP address and the source IP address of the ARP request packet comprises:
determining, by the aggregation switch, the destination IP address of the ARP request packet as the target IP address when the target IP address and the source IP address of the ARP request packet belong to a same network segment; and determining, by the aggregation switch, the destination IP address of the ARP request packet as the IP address of the determined gateway when the target IP address and the source IP address of the ARP request packet belong to different network segments.

5. A device for controlling network access, comprising a processor and a non-transitory machine-readable storage medium storing machine-readable instructions which are executable by the processor to:
configure an Access Control List (ACL) rule on an aggregation switch, wherein the ACL rule comprises a first network segment and a second network segment, and the first network segment and the second network segment correspond to a same user group or different user groups, or the first network segment corresponds to a user group and the second network segment corresponds to a resource group;
receive a user packet from a user terminal sent by an access switch;
compare a source Internet Protocol (IP) address of the user packet with the first network segment in the ACL rule and a destination IP address of the user packet with the second network segment in the ACL rule, wherein the source IP address of the user packet is an IP address in a network segment corresponding to a Virtual Local Area Network (VLAN) associated with a user group to which the user terminal belongs; and discard the user packet when the source IP address of the user packet matches with the first network segment and the destination IP address of the user packet matches with the second network segment;
receive a VLAN identifier corresponding to a user group from a Software-Defined Network (SDN) controller;

configure VLAN and VXLAN corresponding to the user group on the aggregation switch;

establish a corresponding relationship among the VLAN, the VXLAN and a network segment; and configure a gateway IP address and Media Access Control (MAC) address of the VXLAN;

search a routing table for a corresponding egress interface based on the destination IP address when the source IP address of the user packet does not match with the first network segment, or the destination IP address of the user packet does not match with the second network segment;

forward the user packet via a downstream port of the aggregation switch when the found egress interface is the downstream port;

search for a VXLAN identifier corresponding to a VLAN identifier encapsulated in the user packet when the found egress interface is a VXLAN tunnel interface; and obtain a VXLAN-encapsulated packet carried with the VXLAN identifier by performing VXLAN encapsulation for the user packet, and forward the VXLAN-encapsulated packet.

6. The device according to claim 5, wherein the machine-readable instructions further cause the processor to:

receive an Address Resolution Protocol (ARP) request packet for a target IP address sent by the access switch before receiving the user packet sent by the access switch;

determine a gateway for a network segment corresponding to a VLAN based on a VLAN identifier of the VLAN, which is encapsulated in the ARP request packet; and determine a destination IP address of the ARP request packet based on the target IP address and the source IP address of the ARP request packet.

7. The device according to claim 6, wherein the machine-readable instructions further cause the processor to:

in case that the destination IP address of the ARP request packet is an IP address of the determined gateway, send an ARP response packet carrying an MAC address of the determined gateway to the access switch; and in case that the destination IP address of the ARP request packet is not the IP address of the determined gateway, send an ARP response packet carrying the MAC address of the determined gateway to the access switch when the determined gateway has an ARP proxy function, such that the user terminal, after receiving the ARP response packet sent by the access switch, establishes a corresponding relationship between the target IP address and the MAC address of the gateway and sends a user packet with a destination IP address as the target IP address and a destination MAC address as the MAC address of the determined gateway to the access switch.

8. The device according to claim 6, wherein when determining the destination IP address of the ARP request packet based on the target IP address and the source IP address of the ARP request packet, the processor is further caused by the machine-readable instructions to:

determine the destination IP address of the ARP request packet as the target IP address when the target IP address and the source IP address of the ARP request packet belong to a same network segment; and determine the destination IP address of the ARP request packet as the IP address of the determined gateway when the target IP address and the source IP address of the ARP request packet belong to different network segments.

\* \* \* \* \*